United States Patent [19]

Sirven et al.

[11] 4,222,049
[45] Sep. 9, 1980

[54] CIRCUIT ARRANGEMENT FOR ELIMINATING FIXED ECHOES IN A PULSE

[75] Inventors: Jacques Sirven; Jean-Claude Marchais, both of Paris, France

[73] Assignee: Thomson-CSF, Paris, France

[21] Appl. No.: 918,596

[22] Filed: Jun. 23, 1978

[30] Foreign Application Priority Data

Jun. 24, 1977 [FR] France ................... 77 19494

[51] Int. Cl.² ............................................. G01S 9/42
[52] U.S. Cl. ................................................. 343/7.7
[58] Field of Search ...................................... 343/7.7

[56] References Cited

U.S. PATENT DOCUMENTS

| 4,053,885 | 10/1977 | Tomita et al. | 343/7.7 |
| 4,083,049 | 4/1978 | Mattera et al. | 343/7.7 |

Primary Examiner—Maynard R. Wilbur
Assistant Examiner—Richard E. Berger
Attorney, Agent, or Firm—Karl F. Ross

[57] ABSTRACT

To eliminate fixed echoes at the receiver of a pulse radar, incoming i-f signals are demodulated, subjected to Doppler filtering, centered and bottom-clipped to eliminate those whose amplitudes lie below a certain threshold. The centering operation and/or the magnitude of the threshold are controlled automatically as a function of the amplitude of the incoming signals as measured upstream of the Doppler filter.

11 Claims, 6 Drawing Figures

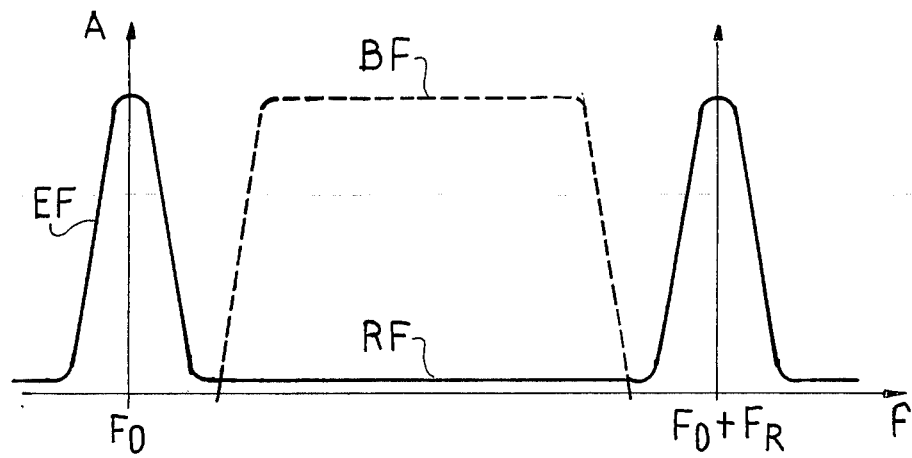
Fig_1
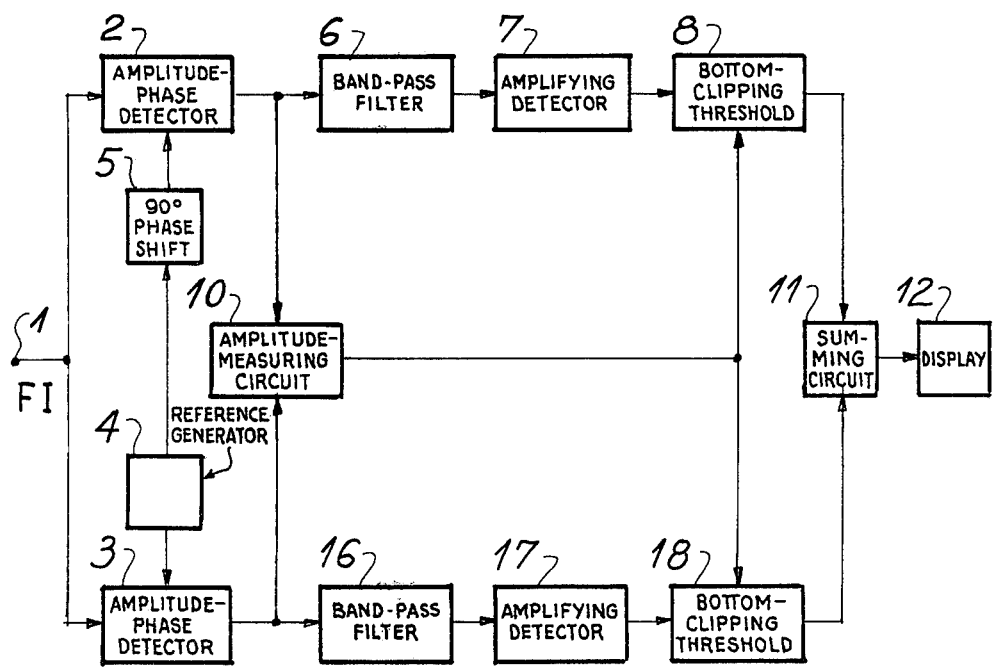
Fig_2

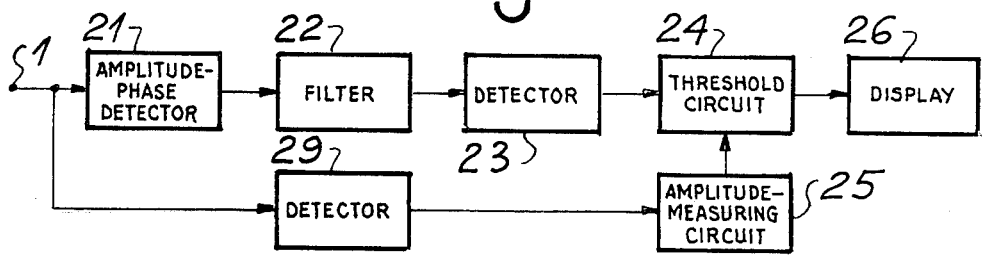
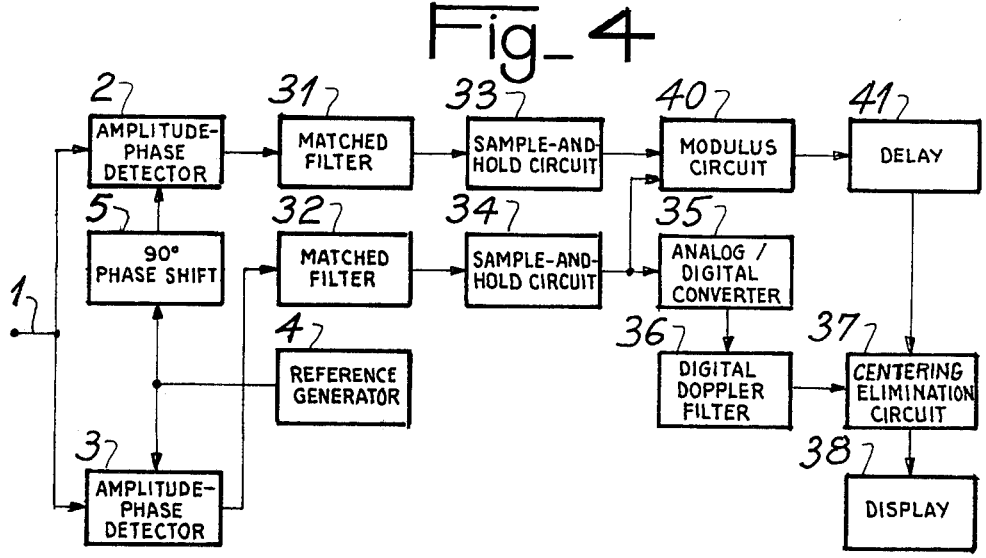
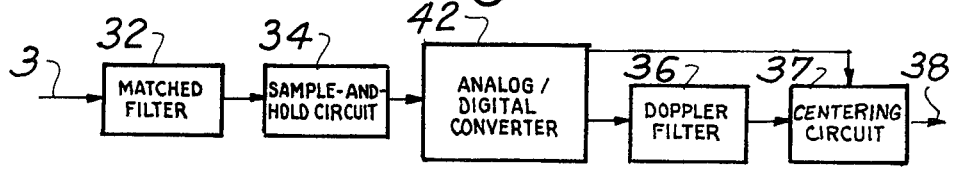
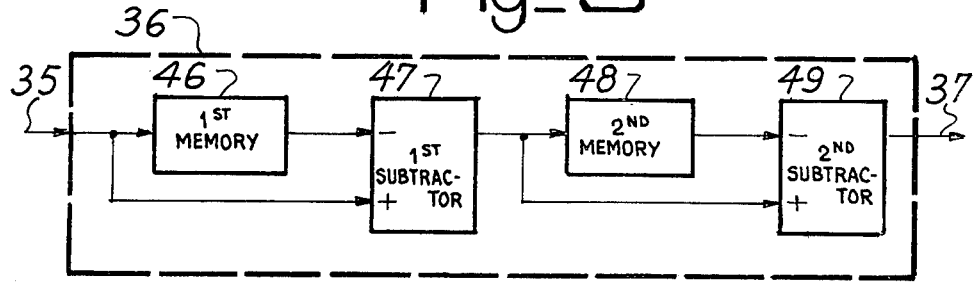

CIRCUIT ARRANGEMENT FOR ELIMINATING FIXED ECHOES IN A PULSE

FIELD OF THE INVENTION

Our present invention relates to a circuit arrangement for eliminating fixed echoes in a pulse radar.

BACKGROUND OF THE INVENTION

The signals received by a radar which is intended chiefly to detect moving targets contain, up to the detection stage, echoes both from fixed targets and from moving targets.

In a fixed radar installation, echoes from fixed targets are characterized by Doppler frequencies of zero or virtually zero whereas echoes from moving targets are characterized by Doppler frequencies which are other than zero and which are related to the radial velocity of the targets. In the case of a moving installation, all the Doppler frequencies are shifted in proportion to the speed of the moving carrier.

Fixed echoes are usually eliminated by band-pass filtering of the video signals. The pass-band of the filter lies between the upper limit of the spectrum of the fixed echoes and the lower limit of the image of the spectrum of the fixed echoes, which is centered on the repetition frequency of the pulses.

Downstream of the filter, or bank of filters, which attenuates the fixed echoes but preserves the moving echoes, a threshold circuit of the bottom-clipping type eliminates any signal whose amplitude is below a predetermined value. This threshold is usually set at a level corresponding to the maximum amplitude of the residue of fixed echoes after filtering, so that any fixed echo has been completely eliminated behind the bottom-clipper. Only moving echoes whose amplitude is above the threshold are passed on.

The disadvantages of such an arrangement lie in its lack of flexibility and ineffectiveness in the presence of strong fixed echoes and weak moving echoes. In effect, throughout the range spread covered by the radar, there are ground echoes, generally few in number, of considerable amplitude, other echoes being of average or lower amplitude. The residue of a strong ground echo after filtering is of not inconsiderable amplitude. If this echo is not to appear on the display, it is necessary for the threshold of the bottom-clipping circuit to be positioned just above this amplitude. However, what this amounts to is eliminating from detection many moving echoes which are situated at various distances from the strong ground echo and which are surrounded by weaker ground echoes. One remedy for this disadvantage is deliberately to lower the threshold but in this case the number of false alarms increases.

OBJECT OF THE INVENTION

One object of the present invention is to provide an arrangement for eliminating fixed echoes which does not have these disadvantages.

SUMMARY OF THE INVENTION

In accordance with the invention, the amplitude of the echoes is measured upstream of the filtering circuits for attenuating the fixed echoes, and downstream of the filtering circuits the threshold is set as a function of the measured amplitude of the echoes, this being done for each range gate independently of the other gates.

Thus, if for example the rejection level for the filter attenuating the fixed echoes is 50 dB, the elimination threshold for the fixed echoes is set at 49 dB below the level of the echoes before filtering. A fixed echo which is attenuated by 50 dB by the filter will be eliminated by the threshold, which is situated 1 dB above the level of the residue after filtering, so as to afford the maximum chance that a moving echo, which is only slightly attenuated by the filter, will be situated above the level of the threshold.

An area which returns strong ground echoes may admittedly hide a few moving echoes situated in the same area but another area will, thanks to our invention, allow even weak moving echoes to appear.

BRIEF DESCRIPTION OF THE DRAWING

Other features of the present invention will become apparent from the following description given with reference to the accompanying drawing in which:

FIG. 1 is an explanatory graph,

FIG. 2 is a block diagram showing the final section of a radar receiver incorporating an arrangement according to the invention;

FIG. 3 is a block diagram similar to FIG. 2, illustrating a modification;

FIG. 4 is a block diagram representing an embodiment of the invention using digital techniques;

FIG. 5 is a block diagram illustrating a modification of the arrangement of FIG. 4; and FIG. 6 shows details of a digital filter.

SPECIFIC DESCRIPTION

A radar system includes a transmitter which emits pulses at a repetition frequency $F_r$ and a carrier frequency $F_o$. In fact, the transmitted frequency is not pure radiation of frequency $F_o$ but has a spectrum of frequencies which extends on either side of the frequency $F_o$ with a maximum at this frequency and other maxima at the frequencies $F_o \pm KF_r$, K being any of a number of integers. At reception, echoes are received in the useful part of each reception period at different times depending upon whether the objects which return the echoes are at a greater or lesser distance from the radar installation. The greater the surface area of an obstacle and the closer it is, the greater is the amplitude of the echo received.

In a ground radar installation, the major proportion of the energy of ground echoes, at reception, is centered on $F_o$. Apart from this proportion, the signals at the output of the receiver are due to moving echoes, to thermal noise and to residual ground echoes.

In a moving installation, the spectrum of the fixed echoes is wider and is centered on a frequency displaced from $F_o$ by an amount which depends inter alia on the speed of the moving carrier. Since the spectrum of the ground echoes is wider, the number of residues which may be confused with moving echoes is greater.

The terminal noise is of constant energy and could easily be eliminated by means of a threshold situated just above it.

The residual fixed echoes, that is to say what remains of the fixed echoes after Doppler filtering, are unfortunately of variable amplitude for the reasons given above (surface area, spectra, different ranges, etc. . . . ). Their amplitude depends not only on the obstacle itself but also on the attenuating ability of the filter and the purity of the transmitted energy.

However, in a given receiver which contains specified filtering means, there is a relationship between the amplitudes of the fixed echoes before and after filtering. This relationship may be determined by calculation and measurement, i.e. by ascertaining the ratio between the amplitude of the fixed echoes before filtering and the amplitude of the residues after filtering. This ratio may be between 30 and 50 dB. In accordance with our present invention we use the knowledge of this ratio to set the threshold for eliminating the residual fixed echoes automatically. The threshold is therefore set in relation to the level of the echoes before filtering.

The threshold may, of course, be adjusted either by shifting the threshold of a bottom-clipping circuit, by acting on the gain of an amplifier situated between the bottom-clipper, whose threshold is then fixed, and the point at which the amplitude of the echoes is measured for the purposes of relative gain control, or by acting on both the threshold and the gain.

With reference to FIG. 1 we shall now analyze the frequency of the signals involved and the operation of the arrangement in the case of a fixed radar installation, for example. The signals emitted by the radar have a spectrum which is represented by a curve EF on the frequency $F_o$. This curve is repeated at the frequencies $F_o \pm KF_r$, were $F_r$ is the repetition frequency of the pulses and K is an integer (here specifically 1).

The pass-band of the Doppler filter is represented by a dotted-line curve BF. The energy which remains after rejection in the Doppler filter is shown at RF. This energy comprises both thermal noise and the residues from fixed echoes. Its level is due to the imperfections of the radar, that is to say to the constant level of noise generated below the level of the radiation emitted at the frequencies $F_o \pm KF_r$, which is eliminated by the Doppler filter. This noise level is always 30 to 50 dB below the level of the echoes received at the frequencies $F_o \pm KF_r$.

FIG. 2 shows a circuit arrangement according to the invention for eliminating fixed echoes. The input terminal 1 of this circuit arrangement receives intermediate-frequency signals FI. This terminal is connected to two amplitude-phase detectors 2 and 3 which are responsible for demodulating the intermediate-frequency signals to form video signals. Detector 3 receives a reference wave for demodulation directly from a reference generator 4. Detector 2 receives the same reference wave, but via a 90° phase-shifting circuit 5. The video-frequency output signals from the detectors are applied respectively to two chains for filtering, amplifying, and eliminating fixed echoes. The first chain, which follows detector 2, comprises a band-pass filter 6 in series with an amplifying detector 7 and a bottom-clipping threshold circuit 8. The second chain, which is connected to detector 3, similarly comprises a filter 16, an amplifying detector 17 and a bottom-clipper 18. The outputs of circuits 8 and 18 are coupled to a summing circuit 11 connected to a display 12, which is given as an example of means for making use of the output signals from our improved echo suppressor. The thresholds for circuits 8 and 18 are controlled by an amplitude-measuring circuit 10 connected to the outputs of detector 2 and 3. This circuit measures the amplitude of the video signals, which are available in the form of components in mutual quadrature.

In an analog embodiment, for example, the amplitude, or modulus, of the video signals is reconstituted from the two outputs in quadrature of the amplitude-phase detectors 2 and 3 by forming the square root of the sum of the squares of the signals from these two outputs. Measuring circuit 10 therefore comprises, for example, wide-band analog multipliers followed by an operational adding amplifier whose output signal is proportional to the square root of the sum of the input signals.

FIG. 3 shows a modification of the aforedescribed arrangement in which the amplitude of the echoes is measured, at intermediate frequency, ahead of the amplitude-phase detectors. For the sake of simplicity, and by way of modification, only one processing chain is shown (which is the case with certain equipment). An amplitude-phase detector 21 receives the intermediate-frequency signals FI and is followed by a filter 22, a detector 23, a variable-threshold bottom-clipper 24 and a display 26. An amplitude-measuring circuit 25 controls the threshold of circuit 24. The amplitude-measuring circuit receives amplitude information from terminal 1 (at intermediate frequency) via a detector circuit 29. The threshold devices represented by circuits 8 and 18 in FIG. 1 and circuit 24 in FIG. 2 eliminate signals whose amplitude is below the threshold set but preserve signals above this threshold. The processing of the signals in the arrangement is linear up to the point of filtering. Such processing has the advantage of not widening the spectrum of ground echoes, thus enabling them to be most satisfactorily eliminated by the filters. In fact, prior-art solutions which consisted in placing a limiting circuit before the filtering stage with the object of reducing the ground echoes to a constant level had the disadvantage of broadening the spectrum of the ground echoes. This broadening makes it more difficult for the filter to attenuate the fixed echoes. This disadvantage, which is of little consequence in ground radar stations, is of much greater consequence in moving installations where the ground echoes have a wider spectrum.

The measurement of the amplitude of the fixed echoes and the corresponding control of the threshold take place with a certain delay relative to the received signals. This delay may be compensated either by delaying the signals upstream of the threshold circuits by the same length of time or by using the amplitude measurement made in the previous repetition cycle to set the threshold. This latter solution is easier to put into practice in an arrangement which employs digital techniques.

FIG. 4 shows an embodiment of the invention in the case where digital processing is applied sequentially to a large number of range channels (also called "quanta" or "gates"). The technology and the methods of implementation are different but the principle of the invention remains the same. The residual echoes whose spectrum is outside the spread covered by the Doppler filter are leveled off, that is to say reduced below an elimination threshold, on the basis of a measurement made of the amplitude (or modulus) of the echoes upstream of the filter. The leveling off is performed either by moving the elimination threshold or by altering the level of the echoes (centering) after filtering (useful echoes with moving targets or residues with fixed targets).

The control action exerted on the centering or threshold, which is based on the amplitude, is delayed by a period equal to the delay caused by the digital filter (a number of repetition cycles).

The intermediate-frequency signals which are applied to terminal 1 are demodulated, as in FIG. 1, by means of a reference generator 4 and two amplitude-phase detectors of which one, i.e. detector 3, supplies a direct video channel Σ while the other, detector 2, 5, supplies a quadrature video channel jΣ. The video signals in the two channels then pass to matched filters 31, 32 and are sampled and stored at a rate dictated by the range quanta in the course of each repetition cycle in sample-and-hold devices 33, 34.

The analog samples from the direct channel are digitally coded in an analog/digital converter 35 and are then processed in a digital Doppler filter 36 of which an embodiment applicable to one range channel is shown in FIG. 6. The filtered signals are applied to a centering and elimination circuit 37 and are then transmitted to further processing means such as a display 38.

The centering and elimination device 37 is for example a binary attenuator (operating by bit shifting), or a high-resolution (2 dB in 2 dB, for example) digital attenuator followed by a fixed threshold. It is controlled by the channel for measuring the modulus or amplitude. This channel includes a modulus-determining circuit 40 which receives the samples from both channels from the outputs of the samplers 33 and 34. The value of the modulus controls the centering device 37 after a delay, in a circuit 41, equal to the delay caused by the digital filter.

The circuit 40 for determining the modulus may operate as follows:

From the data Σ and jΣ sampled and stored in circuits 34 and 33, signals Σ+jΣ and Σ−jΣ are formed of which only the signs are considered.

Also formed are the following eight signals:

$$\pm(0,41\Sigma \pm j\Sigma)$$

$$\pm(0,41j\Sigma \pm \Sigma)$$

A multiplexer having eight analog channels selects one of the eight above-indicated signals, as a function of the signs of Σ, jΣ, Σ+jΣ and Σ−jΣ.

The multiplexed result is converted into a digital signal before being used to control the centering of the echoes, after filtering, in circuit 37.

If the two channels Σ and jΣ are provided with analog/digital converters, the modulus may be produced by simple recoding. A programmed read-only memory which is addressed by the digital signals Σ and jΣ emits the digital modulus, which is used directly as a centering control.

Where the repetition frequency is very high in relation to the Doppler frequencies and the spectrum of the ground and target echoes, the centering control and the analog/digital conversion of the signals from a single channel Σ may be performed by one and the same circuit. This modification is shown in FIG. 5 where only one channel Σ is dealt with. After amplitude/phase detection, the video signals pass through the matched filter 32, the sample-and-hold circuit 34, and an analog/digital converting unit 42 which emits the digital Σ signal and the digital modulus simultaneously. The digital Σ signal then passes through the digital Doppler filter 36, the centering circuit 37 and the following circuits 38. The modulus is applied to circuit 37 as a centering-control signal.

An embodiment of the digital filter 36 is shown in simplified form in FIG. 6. Such filters are familiar to the man skilled in the art. It may for example be a digital filter called a "double cancellation" filter. However, it is of course possible for the filter to employ single or multiple cancellation or to use other filtering techniques depending upon the frequency spread which it is required to cover.

It comprises, in series, a first memory 46 which receives digital signals from the encoder 35 (FIG. 4) or 42 (FIG. 5) and which is intended to delay the signals by one repetition cycle, a first subtractor 47 whose adding and subtracting inputs are respectively connected to the input and the output of memory 46, a second memory 48 identical with memory 46 which is connected to the output of the subtractor 47, and a second subtractor 49 whose adding and subtracting inputs are respectively connected to the input and the output of memory 48. The output of subtractor 49 is connected to the centering circuit 37. The subtracting circuits 47 and 49 include automatic recentering means so that the exponents of the two signals processed in each of them will be equal to that of the larger signal. In the course of passing through the filter, the fixed echoes, which are substantially the same from one repetition cycle to the next, become smaller and smaller and disappear whereas moving echoes, whose size and sign vary, are only slightly attenuated.

We claim:

1. In a pulse radar which includes, at reception, means for demodulating intermediate-frequency signals to form video signals and means for utilizing the video signals, the combination therewith of a circuit arrangement for eliminating fixed echoes situated between said demodulating means and said utilizing means and comprising, in series, Doppler filtering, detecting and amplifying means and bottom-clipping threshold means, means for measuring the amplitude of the received signals upstream of said Doppler filtering means, and means for controlling the gain of said amplifying means as a function of said amplitude.

2. In a pulse radar which includes, at reception, means for demodulating intermediate-frequency signals to form video signals and means for utilizing the video signals, the combination therewith of a circuit arrangement for eliminating fixed echoes situated between said demodulating means and said utilizing means and comprising, in series, Doppler filtering, detecting and amplifying means and bottom-clipping threshold means, means for measuring the amplitude of the received signals upstream of said Doppler filtering means, and means for controlling the threshold of said bottom-clipping means as a function of said amplitude.

3. In a pulse radar which includes, at reception, means for demodulating intermediate-frequency signals to form video signals and means for utilizing the video signals, the combination therewith of a circuit arrangement for eliminating fixed echoes situated between said demodulating means and said utilizing means and comprising, in series, Doppler filtering, detecting and amplifying means and bottom-clipping threshold means, the gain of the amplifying means and the threshold of the bottom-clipping means being variable, means for measuring the amplitude of the received signals upstream of said Doppler filtering means, and means for controlling both the gain of said amplifying means and the threshold of said bottom-clipping means as a function of said amplitude.

4. The combination defined in claim 3 wherein said circuit arrangement also includes means compensating for the measurement delay and the delay in controlling said gain and threshold relative to the received signals and for the delay to the signals in the filtering means.

5. The combination defined in claim 4 wherein the delay compensating means comprise means for storing the gain and threshold control signals from one repetition cycle for one of the subsequent repetition cycles.

6. The combination defined in claim 1 wherein said amplitude-measuring means comprise:

means for producing two video signals in quadrature at the output of said means for demodulating the intermediate-frequency signals, multiplying circuits to produce respectively the squares of the moduli of said two signals in quadrature, and an operational adding amplifier whose output signal is proportional to the square root of the sum of the squares of the moduli.

7. The combination defined in claim 1 wherein said amplitude-measuring means comprise:

means for producing two video signals $j\Sigma$ and $\Sigma$ in quadrature at the output of the means for demodulating the intermediate-frequency signals, means for sampling said signals $\Sigma$ and $j\Sigma$, means for forming a plurality of linear combinations of the signals $\Sigma$ and $j\Sigma$, multiplexing means to select one of said combinations, and means for the analog/digital conversion of the selected combination for the purpose of centering or threshold control after Doppler filtering of the video echoes.

8. The combination defined in claim 1 wherein said amplitude-measuring means comprise:

means for the analog/digital coding of the video signals after demodulation, and means for recoding the coded signals to supply signals to control centering or threshold after Doppler filtering.

9. The combination defined in claim 7 wherein said means for centering after Doppler filtering comprise a digitally controlled variable attenuator.

10. The combination defined in claim 1 or 2 wherein the gain of said amplifying means is variable.

11. The combination defined in claim 1 or 2 wherein the threshold of said bottom-clipping means is variable.

* * * * *